United States Patent [19]

Bouchard et al.

[11] 3,859,232

[45] Jan. 7, 1975

[54] SEMICONDUCTING METAL OXIDES WITH THE CUBIC KSbO$_3$ CRYSTAL STRUCTURE

[76] Inventors: Robert Joseph Bouchard, 2412 Shellpot Dr.; Arthur William Sleight, 406 Nichols Ave., both of Wilmington, Del. 19803

[22] Filed: Dec. 18, 1972

[21] Appl. No.: 316,267

[52] U.S. Cl. ............... 252/519, 252/63.5, 252/521, 252/518
[51] Int. Cl. ........................ H01b 1/08, H01b 3/10
[58] Field of Search ........... 252/518, 519, 521, 463, 252/464, 472, 462, 63.5

[56] References Cited
UNITED STATES PATENTS

| | | | |
|---|---|---|---|
| 3,529,978 | 9/1970 | Taylor et al. ................. | 252/521 X |
| 3,553,109 | 1/1971 | Hoffman ...................... | 252/521 X |
| 3,560,410 | 2/1971 | Schubert ...................... | 252/518 |
| 3,583,931 | 6/1971 | Bouchard ..................... | 252/521 X |
| 3,586,642 | 6/1971 | Matsuo et al. ................ | 252/521 X |
| 3,681,262 | 8/1972 | Bouchard et al. ............. | 252/521 X |
| 3,682,766 | 8/1972 | Maher .......................... | 252/521 X |

*Primary Examiner*—Stephen J. Lechert, Jr.
*Assistant Examiner*—R. E. Schafer

[57] ABSTRACT

Oxides with the cubic KSbO$_3$ crystal structure of the type Bi$_3$GaSb$_2$O$_{11}$ are semi-conducting materials.

12 Claims, No Drawings

SEMICONDUCTING METAL OXIDES WITH THE CUBIC KSbO₃ CRYSTAL STRUCTURE

BACKGROUND OF THE INVENTION

1. Field of the Invention

This invention relates to new electrically semiconducting oxides having the cubic $KSbO_3$ crystal structure. More particularly, it relates to semiconducting oxides with the cubic $KSbO_3$ crystal structure of the type $Bi_3GaSb_2O_{11}$. The compositions contain bismuth or a mixture of bismuth plus a rare earth metal chemically combined with aluminum, gallium, iron, rhodium, ruthenium, antimony, or tellurium, and with eleven oxygen atoms.

2. Description of the Prior Art

Metal oxides containing bismuth or a mixture of bismuth and a rare earth metal chemically combined with various other elements such as gallium, chromium, tellurium and iron, etc., are known, e.g., $BiGaTeO_6$, $Bi_{12}GeO_{20}$, $Bi_4Ti_3O_{12}$, $Bi_2WO_6$, $Bi_3TiNbO_9$ and $BiY_2Fe_5O_{12}$. None of these, however, have the cubic $KSbO_3$ structure.

SUMMARY AND DETAILED DESCRIPTION OF THE INVENTION

The present invention is a metal oxide having the cubic $KSbO_3$ crystal structure characterized by semiconductivity and having the formula $Bi_{3-x}M_xM^1_{1+y}M^2_{2-y}O_{11}$, wherein:

M is a rare earth metal of atomic number 57–71, inclusive;

$M^1$ is aluminum, gallium, iron, rhodium or ruthenium;

$M^2$ is antimony or tellurium;

$x$ is a number in the range 0 to about 1.5;

$y$ is a number in the range 0 to 1;

with the provisos that

1. $y = 0$ when $M^1$ is aluminum, gallium, iron or rhodium and $M^2$ is antimony;
2. $y = \frac{2}{3}$ when $M^1$ is aluminum, gallium, iron or rhodium and $M^2$ is tellurium; and
3. $y = 1$ when $M^1$ is ruthenium and $M^2$ is antimony.

In the most preferred configuration in which $x = y = 0$, the oxides are of the type $Bi_3M^1M^2_2O_{11}$, e.g., $Bi_3GaSb_2O_{11}$.

Up to 50 mole %, preferably 33 mole % of the bismuth atoms may be replaced by a rare earth metal of atomic number 57–71, inclusive, such as lanthanum, gadolinium, etc.

The oxides of the present invention may be prepared by heating together a mixture of the requisite ground oxides in amounts corresponding to the mole ratios in the formula of the desired composition. Since the purity of the product reflects the purity of the reactants used, it is preferred to use reactants having 99+% purity.

Exact stoichiometry is preferred for all metal oxide reactants with the exception of the bismuth oxide which may be present in excess.

The ground oxides are heated at a temperature range of 800°–1100°C., a preferred range being 900°–1000°C. It is preferred to effect the reaction initially in an open vessel. A second firing of longer duration at higher temperatures in evacuated sealed tubes can be carried out in order to obtain single-phase products and remove remaining impurities. Platinum or mullite ($3Al_2O_3 \cdot 2SiO_2$) crucibles open to the air in muffle furnaces are preferred, although other high-melting, inert materials such as Vycor, alumina, gold and the like may be used.

The time of reaction is not critical so long as it is sufficient to produce the desired product as determined by X-ray crystal analysis. Usually the reaction time will be of 10–20 hours duration. With mixtures of certain oxides a second grinding and firing under vacuum at higher temperatures can be carried out to obtain a single phase product. In such cases up to 5 days time may be required.

EMBODIMENTS OF THE INVENTION

The following non-limitative examples will serve to illustrate the practice of the invention. All parts are by weight unless stated otherwise.

EXAMPLE 1

$Bi_3GaSb_2O_{11}$

The proportion of reactants utilized in Example 1 correspond to those theoretically required for the production of $Bi_3GaSb_2O_{11}$, i.e., $3Bi_2O_3 + Ga_2O_3 + 2Sb_2O_3$  $2Bi_3GaSb_2O_{11}$.

For 1 hour, 0.9670 g of $Bi_2O_3$, 0.1297 g of $Ga_2O_3$ and 0.4033 g of $Sb_2O_3$ were ground together in a mechanical agate mortar and pestle. The mixture was fired in an open platinum crucible in a muffle furnace for sixteen hours during which time the highest temperature was 1000°C. The resulting sintered yellowish mass gave an X-ray pattern characteristic of a cubic $KSbO_3$ phase with a lattice parameter of 9.50 Å.

EXAMPLE 2

$Bi_3Ru_2SbO_{11}$

For 1 hour, 1.2584 g of $Bi_2O_3$, 0.4791 g of $RuO_2$ and 0.2624 g of $Sb_2O_3$ were ground in a mechanical agate mortar and pestle. The weights used correspond to the molar ratios implied by the reaction equation, $3Bi_2O_3 + 4RuO_2 + Sb_2O_3$  $2Bi_3Ru_2SbO_{11}$. The mixture was pressed into a pellet and fired to 1000°C. in oxygen for 16 hours. The pellet was then sealed in a platinum tube under vacuum and refired to 1100°C. for 5 days. The product was a brown, single-phase material with a lattice parameter of $9.4248 \pm 0.008$ Å.

EXAMPLE 3

$Bi_3RhSb_2O_{11}$

For 1 hour, 0.7903 g $Bi_2O_3$, 0.2152 g $Rh_2O_3$, and 0.4944 g of $Sb_2O_3$ were ground in a mechanical agate mortar and pestle. The weights used correspond to the molar ratios implied by the reaction equation, $3Bi_2O_3 + Rh_2O_3 + 2Sb_2O_3$  $2Bi_3RhSb_2O_{11}$.

The mixture was pressed into a pellet and fired to 1000°C. in oxygen for 20 hours, sealed in a platinum tube under vacuum, and refired to 1100°C. for 5 days. The product was a brown, single-phase material with a lattice parameter of about 9.51 Å.

EXAMPLE 4

$Bi_3AlSb_2O_{11}$

For 1 hour, 0.9813 g of $Bi_2O_3$, 0.1095 g of $Al_2O_3 \cdot 3H_2O$, and 0.4092 g of $Sb_2O_3$ were ground in a mechanical agate mortar and pestle. The weights used correspond to the molar ratios implied by the reaction equation, $3Bi_2O_3 + Al_2O_3 \cdot 3H_2O + 2Sb_2O_3$  $2Bi_3AlSb_2O_{11}$. The mixture was pressed into a pellet and fired to 1000°C. for 16 hours. The pellet was then sealed in a platinum tube under vacuum and refired to 1100°C. for 5 days. The product had an X-ray pattern corresponding to a cubic $KSbO_3$ type phase with a lattice parameter of 9.45 A, plus a trace of an impurity phase.

EXAMPLE 5

$Bi_3FeSb_2O_{11}$

For 1 hour, 6.3409 g of $Bi_2O_3$, 0.7243 g of $Fe_2O_3$ and 2.9347 g of $Sb_2O_5$ were ground together in an agate mortar and pestle. The weights correspond to the molar ratios in the reaction equation $3Bi_2O_3 + Fe_2O_3 + 2Sb_2O_5 \rightarrow 2Bi_3FeSb_2O_{11}$.

The mixture was placed in a mullite crucible which was placed in a muffle furnace. The temperature was held at 700°C. for 10 hours. The sample was removed from the crucible and reground in an agate mortar and pestle. The reground sample was replaced in the same crucible and heated at 900°C. for ten hours in the muffle furnace. An X-ray diffraction powder pattern showed a predominant cubic $KSbO_3$-type phase with a lattice parameter of 9.524 A.

EXAMPLE 6

$Bi_3Fe_{1.67}Te_{1.33}O_{11}$

For 1 hour 6.1408 g $Bi_2O_3$, 1.1691 g of $Fe_2O_3$ and 2.6901 g $HTeO_4 \cdot 2H_2O$ (telluric acid) were ground together in an agate mortar and pestle. The weights correspond to the molar ratios in the reaction equation, $9Bi_2O_3 + 5Fe_2O_3 + 8H_2IeO_4 \cdot 2H_2O \rightarrow 6Bi_3Fe_{1.67}Te_{1.33}O_{11} + 24H_2O \uparrow$.

The mixture was placed in a mullite crucible in a muffle furnace. The temperature was held at 800°C. for 10 hours. The product was a brown powder whose X-ray diffraction powder pattern showed a predominant cubic $KSbO_3$-type phase with a lattice parameter of 9.473 A.

EXAMPLE 7

$Bi_2LaGaSb_2O_{11}$

For 1 hour, 1.3363 g of $Bi_2O_3$, 0.4672 g $La_2O_3$ 0.2688 g $Ga_2O_3$ and 0.9277 g $Sb_2O_5$ were mixed together by grinding in an agate mortar and pestle. The weights correspond to the molar ratios implied by the reaction equation, $2Bi_2O_3 + La_2O_3 + Ga_2O_3 + 2Sb_2O_5 \rightarrow 2Bi_2LaGaSb_2O_{11}$.

The mixture was placed in a mullite crucible in a muffle furnace. The temperature was held at 1000°C. for 10 hours. The product was a white powder. An X-ray diffraction powder powder pattern showed a predominant cubic $KSbO_3$-type phase with a lattice parameter of 9.512 A.

EXAMPLE 8

$Bi_2GdGaSb_2O_{11}$

For 1 hour 1.3133 g $Bi_2O_3$, 0.5108 g $Gd_2O_3$, 0.2641 g $Ga_2O_3$ and 0.9118 g $Sb_2O_5$ were mixed together by grinding in an agate mortar and pestle. The weights correspond to the molar ratios implied by the reaction equation, $2Bi_2O_3 + Gd_2O_3 + Ga_2O_3 + 2Sb_2O_5 \rightarrow 2Bi_2GdGaSb_2O_{11}$.

The mixture was placed in a mullite crucible in a muffle furnace. The temperature was held at 1000°C. for 10 hours. The product was a white powder having an X-ray diffraction powder pattern showing a predominant cubic $KSbO_3$-type phase with a lattice parameter of 9.457 A.

EXAMPLE 9

Single Crystal of $Bi_3GaSb_2O_{11}$

For 30 minutes, 16.7744 g $Bi_2O_3$ (a 500% molar excess), 0.8744 $Sb_2O_3$, and 0.5624 g $Ga_2O_3$ were ground together with a mechanized agate mortar and pestle. The mixture of ground oxides was fired in an open platinum crucible in a muffle furnace to 1060°C. On reaching this temperature, the mixture was cooled at a rate of approximately 2°C per hour to approximately 700°C and then removed from the furnace. The product was leached with 1:1 $HNO_3$ to remove excess $Bi_2O_3$. Some transparent crystals in the 3–5 mm range were observed. X-ray patterns of these crystals were typical of the cubic $KSbO_3$ crystal structure with all lines indexing similarly ($a_o = 9.45$ A.). A Gunier x-ray photograph of a single crystal showed a phase having a lattice parameter of $9.4907 \pm .0002$ A.

The metal oxides of the present invention are useful for a variety of dielectric applications. The compounds possess high dielectric constants which are independent of temperature and also possess low dissipation factors. Temperature invariance of dielectric constants is a very unusual property since most good dielectrics have dielectric constants which depend strongly on temperature.

For example, capacitor dielectrics generally fall into two categories: the first which has a relatively temperature-independent dielectric constant, but whose dielectric constant is very low (5–10). Such materials as electrical porcelain and mica fall into this class. The second category includes materials like $BaTiO_3$, which have very high dielectric constants (>1000), which is desirable, but are extremely temperature dependent, which makes them useless as circuit elements in tuning or resonance circuits since small, normally unavoidable changes in ambient temperature throw the circuit out of resonance.

The compositions of this invention are also useful for screen-printable dielectric applications. A requirement for this application is that the material, after printing in a pattern through a screen, sinters to a dense, adherent film under firing conditions commonly employed in the thick film industry, i.e., belt furnaces with top temperatures in the 1000°–1050°C. range. It is somewhat unusual to find a material which has these properties, especially without the addition of any low-melting binders. For example, $BaTiO_3$ dielectric has to be fired at temperatures greater than 1200°C. to achieve sintering, so it is completely unsuitable for screen-printable applications.

EXAMPLE A

Measurements for dielectric constants and dissipation factors were performed with a capacitance bridge on $Bi_3GaSb_2O_{11}$, both in sintered pellet form and in the form of a single crystal. These results are listed in the table.

Dielectric Constants and Dissipation Factors of $Bi_3GaSb_2O_{11}$

| Form of Compound | Frequency (Hz) | Dielectric Constant (K') | Dissipation Factor (DF) |
|---|---|---|---|
| 1. Single Crystal | $10^3$ | 69.6 | 0.0080 |
| | $10^4$ | 68.7 | 0.0038 |
| | $10^5$ | 68.3 | 0.0021 |
| | $10^6$ | 68.3 | 0.0021 |
| 2. Sintered Pellet | $10^3$ | 30 | 0.0001 |
| | $10^4$ | 30 | 0.0006 |
| | $10^5$ | 30 | 0.0003 |
| | $10^6$ | 30 | 0.0019 |

The dielectric constants reported above are essentially independent of temperature from −50°C. to +250°C.

The embodiments of the invention in which an exclusive property or privilege is claimed are defined as follows:

1. A semiconducting metal oxide of cubic $KSbO_3$ crystal structure having the formula $$Bi_{3-x}M_xM^1_{1+y}M^2_{2-y}O_{11}$$

wherein
M is a rare earth of atomic number 57–71 inclusive;
$M^1$ is aluminum, gallium, iron, rhodium or ruthenium;
$M^2$ is antimony or tellurium;
$x$ is a number in the range 0 to about 1.5;
$y$ is a number in the range 0 to 1;
with the provisos that
 1. $y = 0$ when $M^1$ is aluminum, gallium, iron or rhodium and $M^2$ is antimony;
 2. $y = \frac{2}{3}$ when $M^1$ is aliminum, gallium, iron or rhodium and $M^2$ is tellurium; and
 3. $y = 1$ when $M^1$ is ruthenium and $M^2$ is antimony.
2. A metal oxide according to claim 1 in which $y = 0$.

3. The metal oxide according to claim 1 in which has the formula $$Bi_3GaSb_2O_{11}.$$

4. The metal oxide according to claim 1 which has the formula $$Bi_3Ru_2SbO_{11}.$$

5. The metal oxide according to claim 1 which has the formula $$Bi_3RhSb_2O_{11}.$$

6. The metal oxide according to claim 1 which has the formula $$Bi_3AlSb_2O_{11}.$$

7. The metal oxide according to claim 1 which has the formula $$Bi_3FeSb_2O_{11}.$$

8. The metal oxide according to claim 1 which has the formula $$Bi_3Fe_{1.67}Te_{1.33}O_{11}.$$

9. The metal oxide according to claim 1 which has the formula $$Bi_2LaGaSb_2O_{11}.$$

10. The metal oxide according to claim 1 which has the formula $$Bi_2GdGaSb_2O_{11}.$$

11. A dielectric composition comprising a metal oxide of claim 1.

12. A dielectric composition comprising the metal oxide of claim 3.

* * * * *